(12) United States Patent
MacKay et al.

(10) Patent No.: US 9,794,224 B2
(45) Date of Patent: Oct. 17, 2017

(54) SYSTEM AND METHOD FOR CREATING A TRUSTED CLOUD SECURITY ARCHITECTURE

(71) Applicant: SUPERNA BUSINESS CONSULTING, INC., Ottawa (CA)

(72) Inventors: Andrew E. S. MacKay, Carp (CA); Kyle Fransham, Ottawa (CA)

(73) Assignee: SUPERNA INC., Ottawa (CA)

( * ) Notice: Subject to any disclaimer, the term of this patent is extended or adjusted under 35 U.S.C. 154(b) by 127 days.

(21) Appl. No.: 14/850,408

(22) Filed: Sep. 10, 2015

(65) Prior Publication Data
US 2016/0080323 A1    Mar. 17, 2016

Related U.S. Application Data

(60) Provisional application No. 62/049,060, filed on Sep. 11, 2014.

(51) Int. Cl.
*H04L 29/06* (2006.01)
*G06F 21/57* (2013.01)
(Continued)

(52) U.S. Cl.
CPC .......... *H04L 63/0245* (2013.01); *G06F 21/57* (2013.01); *H04L 41/12* (2013.01);
(Continued)

(58) Field of Classification Search
CPC ......... G06F 21/57; H04L 63/10; H04L 63/20; H04L 63/0245; H04L 63/0272; H04L 63/0864; H04L 41/12; H04L 43/10
(Continued)

(56) References Cited

U.S. PATENT DOCUMENTS 5,319,633 A * 6/1994 Geyer ................... H04L 12/42
340/9.1
8,464,335 B1 * 6/2013 Sinha ..................... G06F 21/51
713/153
(Continued)

OTHER PUBLICATIONS

Phemius, K., Bouet, M., & Leguay, J. (May 2014). Disco: Distributed multi-domain sdn controllers. In Network Operations and Management Symposium (NOMS), 2014 IEEE (pp. 1-4). IEEE.*

*Primary Examiner* — Syed Zaidi
(74) *Attorney, Agent, or Firm* — DLA Piper LLP US

(57) ABSTRACT

The present invention provides a method for providing a computer implemented method and system for creating a trusted cloud security architecture having the following steps: a primary agent communicating with two or more secondary agents creating a trust ring or other shape of agent communications, the primary agent operating on a primary guest OS and two or more secondary agents operating on two or more secondary guest OSs; implementing a latency based topology for the trust ring having a network of links between disparate IP addresses, the disparate IP addresses corresponding with the primary agent and two or more secondary agents; the primary agent and two or more secondary agents exchanging data packets between the latency based topology within the trust ring; and outputting the exchanged data packets to a processing engine, the processing engine determining a trust status for the trust ring, the trust status based on the data packets between the latency based topology.

10 Claims, 3 Drawing Sheets

(51) Int. Cl.
*H04L 12/24* (2006.01)
*H04L 12/26* (2006.01)
(52) U.S. Cl.
CPC .......... *H04L 43/0864* (2013.01); *H04L 43/10* (2013.01); *H04L 63/20* (2013.01)
(58) Field of Classification Search
USPC .......................................................... 726/13
See application file for complete search history.

(56) References Cited

U.S. PATENT DOCUMENTS

| | | | | |
|---|---|---|---|---|
| 8,555,381 B2 * | 10/2013 | McLaughlin | ....... | H04L 63/0209 713/154 |
| 8,832,818 B2 * | 9/2014 | Kuehl | ................ | H04L 63/0209 709/223 |

* cited by examiner

SYSTEM AND METHOD FOR CREATING A TRUSTED CLOUD SECURITY ARCHITECTURE

CROSS-REFERENCE TO RELATED APPLICATIONS

This application claims the benefit of U.S. Provisional Patent Application No. 62/049,060, filed Sep. 11, 2014, which is incorporated by reference in its entirety.

FIELD OF THE INVENTION

The present invention pertains to the field of virtual computerized environments and in particular, security implementation within virtual computerized environments.

BACKGROUND

With respect to adoption of virtual computerized environments, or cloud computing environments, security concerns are paramount. Conventional security implementations are not adequate to address the concern with virtualization.

To secure these virtual applications, a new security framework must be deployed—one that works within the virtualization layer of the data center, connects it to the physical data center, and addresses additional requirements of scalable, multitenant environments.

Virtual Machines (VM) are often built as an operating systems or appliances to execute within a shared computer, network and storage infrastructure with a cloud service provider (CSP).

Virtual Machines can be configured to boot on a hypervisor operating system. This hypervisor operating system is designed to host guest operating systems on a shared hardware platform.

A Virtual Machine's data and execution of binaries (compiled applications) that manipulate the data on the disk operates under a trust model. This trust model is founded on the basis that the host is providing the virtual container to boot and execute machine instructions.

This trust model can lead to a number of false artifacts with respect to trust. For example, the hypervisor boot sequence from hardware implicitly trusts the BIOS that booted the operating system. Moreover, Intel's® TXT (Trusted Execution Technology) provides a cryptographic chip set (a Trusted Platform Module) to fingerprint and store a boot image in hardware, to compare each boot process against the previous known good fingerprint. The failed comparison results in the hardware exposing an API to the hypervisor to check the trust factor of the boot in a secure way to determine if the host computer or boot files have been tested by the hardware from the previous boot.

This TXT/TPM check is only done at hypervisor boot time. Therefore, a guest OS boot or start time is not privy to this check. The chain of trust assumes that the hypervisor trusts the boot process by checking with the hardware register; in this way, all guests can boot in a trusted state on the host without the requisite checks.

Virtual Machine migration from one host to another is supported by hypervisor using a method that is transparent to the guest OS; which can mean that the IP address, disk drives, data and running applications will be unaware and unable to detect the migration from one host to another. This situation within a CSP or enterprise means the running a Virtual Machine may be moved to an untrusted host without any method available to the guest OS to detect the migration of the trust status of the new host running the application code.

The security risk posed by the above capabilities means secured applications, even with encrypted file systems can have their run time functions moved to untrusted hosts that are now capable of manipulating the execution environment to the benefit of the untrusted host allowing potential data loss, calculation error injection, a new binary installed as trojan horse, root or administrator login attacks to comprise the guest OS, among other types of risk events.

The security risks are guest OS independent, and provides an obstacle to the adoption of highly secured applications from leveraging CSP's without a means to fully secure the boot and running execution of secured applications to detect and block, alert or prevent any operating state that would expose the guest OS VM from security attacks when executing within a CSP or secure enterprise infrastructure. Therefore, there is a need for a system and method for creating a trusted cloud security architecture.

SUMMARY OF THE INVENTION

An object of the present invention is to provide a system and method for creating trusted cloud security architecture. In accordance with an aspect of the present invention, there is provided a computer implemented method for creating a trusted cloud security architecture having the following steps: a primary agent communicating with two or more secondary agents creating a trust ring, the primary agent operating on a primary guest OS and two or more secondary agents operating on two or more secondary guest OSs; implementing a latency based topology for the trust ring having a network of links between disparate IP addresses, the disparate IP addresses corresponding with the primary agent and two or more secondary agents; the primary agent and two or more secondary agents exchanging data packets between the latency based topology within the trust ring; and outputting the exchanged data packets to a processing engine, the processing engine determining a trust status for the trust ring, the trust status based on the data packets between the latency based topology.

In accordance with another aspect of the present invention, there is provided a computer implemented system for creating a trusted cloud security architecture for a primary agent with two or more secondary agents having: a communication module configured to allow communication between the primary agent with the two or more secondary agents to create a trust ring, the primary agent and two or more secondary agents configured to operate on a primary guest OS and two or more secondary guest OSs respectively; a topology module configured to implement a latency based topology for the trust ring having a network of links between disparate IP addresses, the disparate IP addresses corresponding with the primary agent and two or more secondary agents, and wherein the topology module is further configured such that the primary agent and two or more secondary agents exchange data packets between the latency based topology within the trust ring; a processing engine configured to determine a trust status for the trust ring, the trust status based on the data packets between the latency based topology; and an interface to a communication means allowing communication between the communication module, topology module, processing engine, primary agent, and two or more secondary agents.

BRIEF DESCRIPTION OF THE FIGURES

Embodiments of the present invention will be better understood in connection with the following Figures, in which.

DETAILED DESCRIPTION OF THE INVENTION

Methodology Overview

Figure 1:
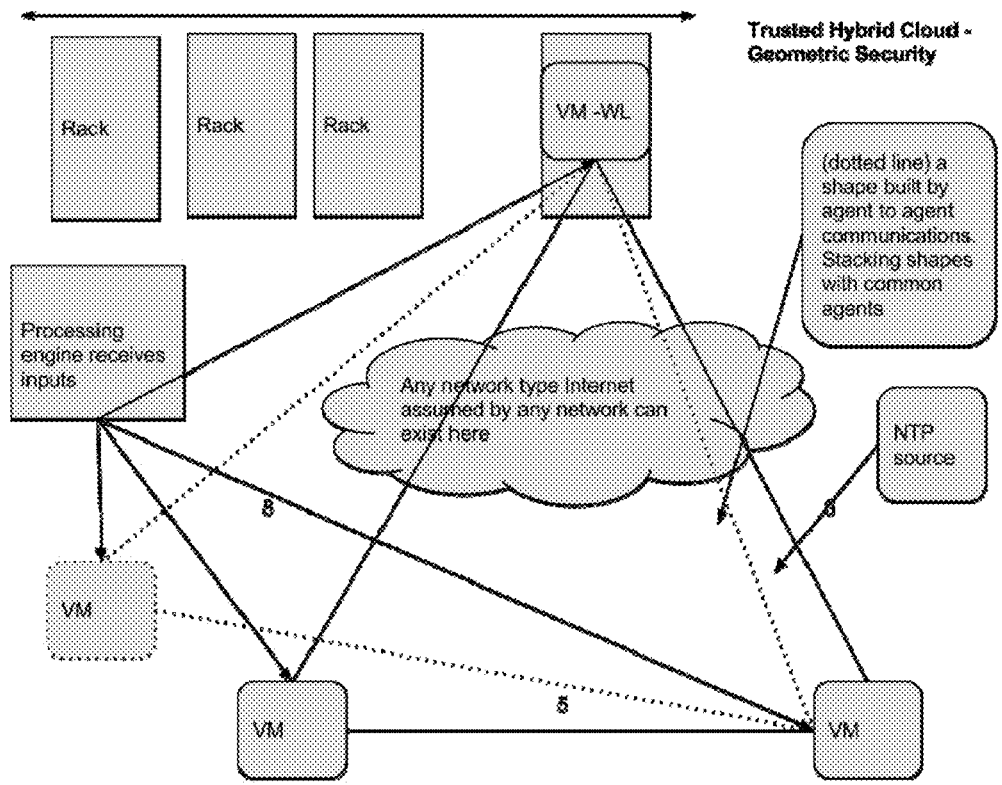
FIG. 1 illustrates one embodiment of the system implementation.

The present disclosure provides for a system and method which allows for virtual machines to be booted and block and alert live migration or movement from changing hosts using a geometric latency calculation by agents that is validated continuously throughout the operating life cycle of a running VM or a group of VMs operating in a trust geometric shape. This is performed for a variety of situations including, but not limited to, standard operations of a VM during boot, and/or a stopped or paused VM that is subsequently booted. An example of the system implementation can be seen in FIG. 1.

An agent is provided within each guest OS that is operating in a Cloud Service Provider (CSP) or infrastructure where it is the objective to block or alert on migration of the target pinned VM. A pinned VM is any guest OS VM that has been set to run on a particular trusted host and its migration should be monitored and approved, blocked or altered under any condition that is suspicious. In at least one embodiment, a select number of VMs are pinned. In at least one embodiment, all VMs are pinned.

The agent can be defined as any software and/or hardware required to monitor the activity of the guest OS. In at least one embodiment, the agent is implemented as a binary at kernel level of the guest OS intercepting all inputs/outputs.

In at least one embodiment, the agent uses a connection oriented encryption and an authenticated protocol to communicate with other agents.

Multiple agents collaborate in order to analyze data packets sent between each of the agents to monitor various metrics such as latency. In at least one embodiment, there is a primary agent and two or more secondary agents. The primary agent initiates communication with the two or more secondary agents. The agents, if available, will engage the primary agent. Once the primary agent receives two or more secondary agents, the entities form a trust ring.

A trust ring comprises of a group of agents that collaborate to create a configuration whereby all agents share and exchange data packets. The data packet exchange includes information relating to latency and other meta-data between agents to allow an overall status to be calculated independently by each agent and shared with all other agents in the trust ring. In at least one embodiment, the agents have disparate IP addresses. With disparate IP addresses, each agent can send and receive data packets based on this IP address. Identification of agents can be attained using IP address and port combination (in place of DNS name) of allowed targets to include in the trust ring entered during installation process.

In at least one embodiment, the agents belonging to one trust ring may belong to any number of other trust rings. In this way, a single agent may be part of multiple trust rings, with a collection of agents for each respective trust ring.

In at least one embodiment, the trust ring formation function requires each agent within a trust ring to be installed with a list of authorized agents. In this way, the agents that fall within an authorized agents list will have the ability to join other trust rings automatically. This check is done during authentication. Following authentication the agents utilize an agreed method to create a session key to encrypt the data packet transfer and exchange between the agents. The agents may select prior to engaging the system whether to allow other labeled agents as authorized. In at least one embodiment, the agent may receive instruction from a system administrator upon prompt.

The trust ring necessitates a geometric shape based on the number of agents in the trust ring in order to provide a latency based topology. In a trust circle with three agents, the simplest shape is a triangle and requires agents to build A to B, and B to C, and C to A relationships using an assignment methodology. The assignment methodologies for latency based topology may vary depending on application. In at least one embodiment, the assignment methodologies may be based on eth0 (Ethernet) mac address highest to lowest OR IP address hash highest to lowest to assign A, then B then C agents. Alternate assignment methodologies are possible for other geometric shapes. For example a trust ring with 10 agents may require a varying topology based on the latency and ease of data transfer.

Assignment methodology for latency based topology may be based on numerous factors including, but not limited to:
a. time stamp of peer and all related input;
b. measured latency from the peer VM secure messages;
c. trend of jitter between messages to eliminate deviations due to packet congestion or delay from Internet links. The history over which this is measured allows for a more accurate calculation to eliminate high or low points that occur on regular basis (e.g., weekends or Friday evenings etc.). The longer the history, the more trusted latency delay can be trusted;
d. guest OS CPU utilization as random value to correlate with latency as a means to lower the weight of latency variation caused by packet delay or host CPU impacts; and
e. eth0 interface packet discards or errors since last sync data packet exchange sent used as impact on weighting the particular sync data packet exchange in the overall calculation.

The latency based topology requires each agent to retrieve and authenticate using time stamps and initiate sending a packet with time stamp on regular intervals to one or more agents in the trust ring. This provides for a table of timestamps and measured latency of the receive time offset from the time stamp of a given agent packet.

In at least one embodiment, an NTP protocol is utilized to synchronize and validate correct time stamps for the trust ring.

Each agent shares a calculated viewpoint on the trust status with agents in the trust ring. A deviation from this value is used by the trust ring to determine if the untrusted VM may have moved in relation to its initial trusted boot location by a processing engine. In at least one embodiment, the processing engine may be an enterprise server operating independent of any Guest OS. This calculation is compared to a pre-determined threshold value. The pre-determined threshold value may set by a variety of methods including, but not limited to, be an average latency status during calibration, or a last known status given the same set of parameters.

In at least one embodiment, identification of the untrusted VM within a trust ring using yes/no response during installation is sent to a system administrator. This sync update may be sent using a flag to indicate the agent is an untrusted location to be monitored.

Figure 2:
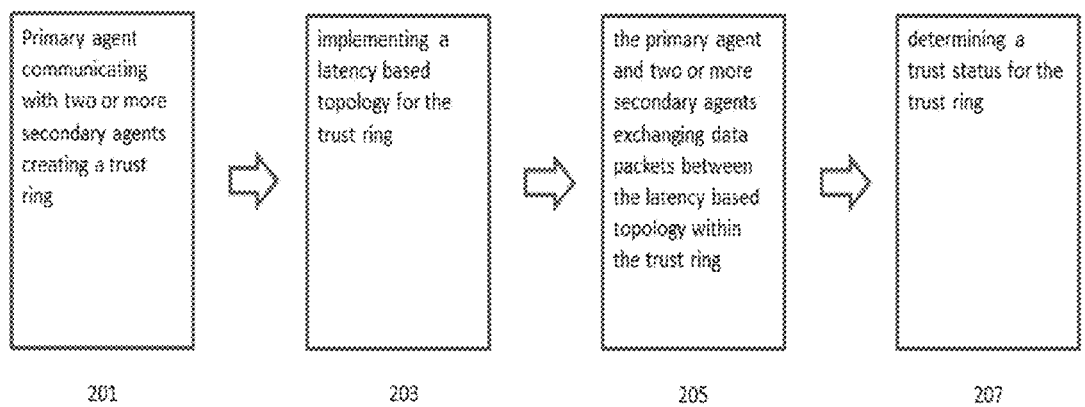
FIG. 2 illustrates one embodiment of the methodology implementation.

An example of one implementation of the methodology can be seen in FIG. 2. An agent, primary agent, communicates with other agents (201). Each agent operates on their own respective guest OSs. If the primary agent can attain the other agents to join, based on permissions and/or availability and make a trust ring, the subsequent step involves implementing a latency based topology (203). The topology is based on the links between each agent. Each agent has disparate IP addresses in order to communicate and measure transmissions. The agents exchange data packets between the trust ring now that a topology has been implemented (205). Finally a processing engine determines the trust status for the trust ring (207) based on the exchanged data packets.

Security Features

There are a number of security features which may be implemented depending on application. In at least one embodiment, the agents authenticate with each other prior to sending any data packets in regards to meta-data, latency, etc. Authentication may be implemented by any means known to the skilled worker in the art in order to validate the agent is legitimate from a guest OS and that the time stamp is synchronized from a single source for all agents within a respective trust ring.

In at least one embodiment, the authenticated trusted NTP source synchronizes to a stratum 3 clock or better such that agents can authenticate and maintain accurate clock timing. It is expected that further enhancements to TXT technology can be extended to clock accuracy with authentication such that time can be trusted from the host hardware and the guest has access to query this time value in a trusted and secure way. Typically guest OSs cannot make direct queries to hardware and therefore need to trust the hypervisor implicitly. TXT overcomes this trust factor of VM to hypervisor hardware.

In at least one embodiment, trusted boot TXT TPM enabled hosts are implemented. This provides for an additional extra layer of trust to the VM execution environment that extends the solution to integrate with existing hardware security features present in the hardware.

In at least one embodiment, agents are physically running at N−1 trusted physical sites on trusted hosts. The −1 one count indicates that at least one agent is running in a CSP or location that is not trusted from a host boot perspective or where multiple hosts exist and it's undesirable for VM's to change hosts for security reasons.

The security requirements of FedRAMP, PCI, ITSG and HIPAA all require a security boundary of physical equipment that is required to comply with security controls to be considered compliant with the standard by law. This also requires documented or proven status of the security boundary by audit which is a one-time event or yearly, leaving a large GAP in the potential security of the environment post audit.

In at least one embodiment, installation of an agent within Guest OSs will require at a minimum an x.509 assigned certificate signed by trusted CA OR shared secret pass phrase.

In at least one embodiment, agents have access to root and administrative privileges on guest OS.

System Implementation Overview

Figure 3:
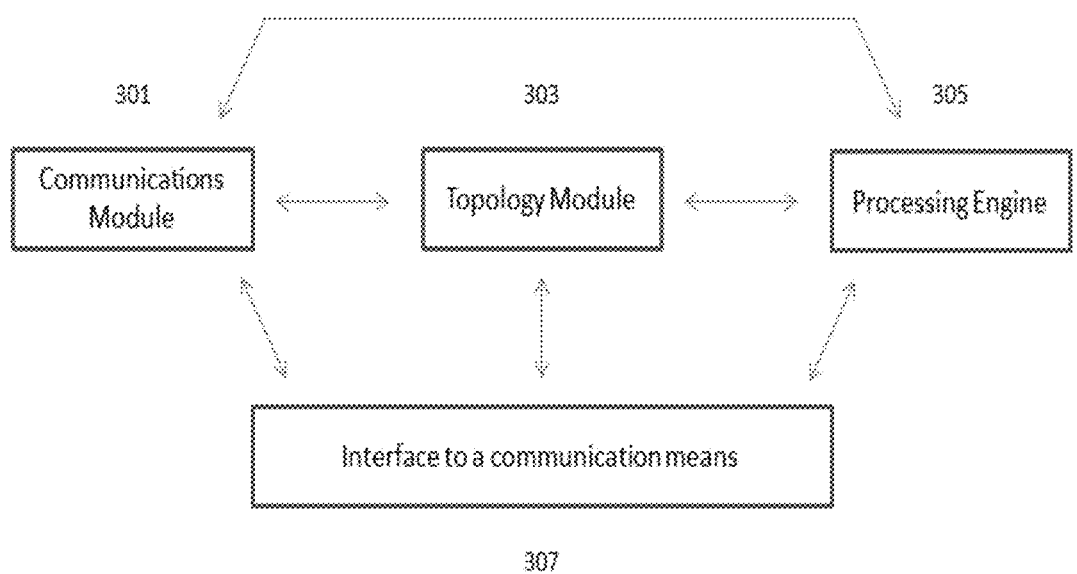
FIG. 3 illustrates on embodiment of system component aggregation.

The system for creating trusted cloud security architecture may be implemented in a variety of formats comprising modules handling discrete functions. One example of a system implementation can be seen in FIG. 3, according to an embodiment.

A communication module (301) is included for each agent where the module allows for communication between the agents and providing authentication. The communication module may be of any suitable hardware/software facilitating the communication between the agents. In at least one embodiment, the communication module is a server configuration with authentication and encryption capabilities. The operations of a single server may be shared for all agents and all trust rings. In at least one embodiment, the functionality of the communication module is discrete, while hardware components are shared between modules.

A topology module (303) is included for each agent where the module allows for the agents to determine and implement a specific latency based topology based on assignment methodology for a specific trust ring. The topology is in communication with the other modules including the communication module. In at least one embodiment, the topology module is a server configuration with processing capabilities. The operations of a single server may be shared for all agents and all trust rings. In at least one embodiment, the hardware is discrete between the topology module and other modules. In at least one embodiment, the functionality of the topology module is discrete, while hardware components are shared between modules.

A processing engine module (305) is included for each agent where the module allows for the computation of the trust status for each trust ring continuously. The processing engine is in communication with the agents through other modules including the communication module, and topology modules. In at least one embodiment, the processing engine module is a server configuration with processing capabilities. The operations of a single server may be shared for all agents and all trust rings. In at least one embodiment, the hardware is discrete between the processing engine module and other modules. In at least one embodiment, the functionality of the processing engine module is discrete, while hardware components are shared between modules.

An interface to a communication means (307) is implemented which provides for each of the modules to communicate with one another through a variety of means. The communications means would be understood by a worker skilled in the art to include any necessary elements of hardware, including but not limited to communications ports, wireless transmitter/receivers, wires or fiber optics; and software, including but not limited to telephony, e-mail, facsimile, Near Field Communication (NFC), IEEE 1394, USB, proprietary proximity based protocols, Bluetooth®, TCP/IP, FTP, XML, and IRC, that allow the modules and agents to exchange data packets with one another.

Trust Status Output

The trust status may be output to an output module or external device depending on system implementation. In at least one embodiment, the system administrator may configure the output status. In at least one embodiment, the output status is coded within the agents.

In at least one embodiment, the trust status is sent to a cloud based server which outputs flags from untrustworthy statuses, among other status codes. The cloud based server may be assessable by the system administrator or another similarly authorized user. In this way, an authorized person may view the status of the virtual system via a mobile electronic device with network connectivity.

In at least one embodiment, there is a centralized dashboard user interface implemented within the trusted site and has IP access all agents over the network. The centralized dashboard is included in the "trust ring" and can participate with multiple trust rings concurrently as an observer node of the status of the trust ring.

Actions can be taken that affect the trust status of the ring, either by individual agents or automated processes by security, provisioning, or cloud system providers or enterprises operating a hybrid cloud. In some embodiments a trust boundary is maintained ensuring virtual machines or applications operating in a CSP can maintain a high level of trust by not moving or changing hosts.

A trust ring can be any shape, for example a ring, triangle, hexagon, etc. The shape is to some extent dictated by the number of agents in the topology; for example a triangle includes 3 agents, a hexagon includes 6 agents. The level of trust increases with the number of agents as each agent which is included provides additional agent-to-agent perspectives that can be processed by the compute engine to derive a security state for each VM with an agent.

The agent-to-agent communications are relayed to the processing engine to calculate each agent/VM status as a trust level. This trust level can leverage other inputs from the local OS for each agent to augment inputs from logs and firewall rules, as well as process state changes. The compute engine instance relies on multiple view points of each agent from the shape of the trust ring, with multiple trust scenarios being possible. For example:
  a. Agent neighbors with the lowest latency responses are weighted higher than agent updates that have higher latency; and/or
  b. Agents that supply local OS finger print updates on process, firewall, log entries are weighted higher than agents that do not supply augmented trust data.

The processing engine can use the trust status to implement actions to improve the trust level of the ring. A non-exhaustive list of examples includes:
  a. Evict an agent VM from the ring and prevent any inputs to the ring trust updates from the evicted agent;
  b. Firewall an evicted agent VM to prevent the agent from communicating with other agents;
  c. Raise a system alert via dashboard or API to an external system that uses security updates for automated actions and responses;
  d. Shutdown the host running the compromised agent and any other co-located agents on the same host;
  e. Signal via API a provisioning system to re-launch the evicted VM (or application container or equivalent OS running agent software) on a new host and allow the re-launched VM to rejoin the trust ring;
  f. Shutdown the entire trust ring as comprised by evicting all agents. This may require OS shutdown to partition the evicted agents from other trust rings;
  g. Initiate a trust update message to re-calculate or set state to unknown by flushing state and waiting for updates to recomputed the trust status.

A system administrator can determine the latency based topology based on a number of criteria. The topology can have a variety of shapes. This implies a topology in which links carrying agent-to-agent communications form a shape based on the selected shape for the trust ring for example a circle, triangle or other shapes. More agents provide more options to increase trust level using agent data on the engine to determine trust status from each agent's perspective.

The processing engine can enforce a shape before allowing a trust status with criteria which can include:
  i. Number of agents;
  ii. Latency between agents;
  iii. Shape changes allows by adding more agents to an existing trust ring; and
  iv. Agents that participate in multiple trust rings.

The present disclosure has been described with reference to specific examples. It will be understood that the aforementioned examples are intended to describe embodiments of the invention and are not intended to limit the invention in any way. It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. A computer implemented method for creating a trusted cloud security architecture comprising the following steps:
    a primary agent communicating with two or more secondary agents creating a trust ring, the primary agent operating on a primary guest Operating System (OS) and two or more secondary agents operating on two or more secondary guest Operating Systems (OSs);
    implementing a latency based topology for the trust ring comprising a network of links between disparate IP addresses, the disparate IP addresses corresponding with the primary agent and two or more secondary agents;
    the primary agent and two or more secondary agents exchanging data packets between the latency based topology within the trust ring; and
    outputting the exchanged data packets to a processing engine, the processing engine determining a trust status for the trust ring, the trust status based on the data packets between the latency based topology.

2. The method of claim 1 wherein each of the primary agent and each of the two or more secondary agents may simultaneously serve as an agent for one or more other trust rings, the one or more other trust rings having its own respective latency based topology.

3. The method of claim 1 wherein the data packets between the latency based topology comprise ping data or alternate round trip based protocol, having latency measurements of distance traveled between source and destination.

4. The method of claim 1 wherein each of the primary agent and each two or more secondary agents provides for authentication prior to communication.

5. The method of claim 4 wherein authentication further comprises each of the primary agent and each two or more secondary agents to synchronize with a network time protocol source.

6. The method of claim 1 wherein communication and data packet exchange includes encryption.

7. The method of claim 1 wherein the latency based topology is selected by an assignment methodology.

8. The method of claim 7 wherein the assignment methodology comprises Ethernet mac address priority, IP address hash, and similar latency based priority schemes.

9. The method of claim 1 wherein the latency based topology is determined by a system administrator, wherein the system administrator determines the shape, number of agents and latency between agents.

10. The method of claim 1 wherein the primary guest OS and two or more secondary guest OSs implement Trusted Execution Technology (TXT) and Trusted Platform Module (TPM) enabled hosts.

* * * * *